United States Patent
Hahm et al.

(10) Patent No.: US 7,221,416 B2
(45) Date of Patent: May 22, 2007

(54) LCD BACKLIGHT UNIT AND LCD HAVING THE SAME

(75) Inventors: Hun Joo Hahm, Kyungki-do (KR); Jung Kyu Park, Seoul (KR); Young June Jeong, Kyungki-do (KR); Young Sam Park, Seoul (KR); Hyung Suk Kim, Kyungki-do (KR); Ho Sik Ahn, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 200 days.

(21) Appl. No.: 10/997,895

(22) Filed: Nov. 29, 2004

(65) Prior Publication Data

US 2006/0055843 A1    Mar. 16, 2006

(30) Foreign Application Priority Data

Sep. 14, 2004    (KR) .................. 10-2004-0073340

(51) Int. Cl.
*G02F 1/1335*    (2006.01)
(52) U.S. Cl. .......................................... 349/65; 349/69
(58) Field of Classification Search .................. 349/65, 349/69; 362/612–613
See application file for complete search history.

(56) References Cited

U.S. PATENT DOCUMENTS 5,921,652 A * 7/1999 Parker et al. ............... 362/601

6,951,401 B2 * 10/2005 Van Hees et al. ........... 362/612

FOREIGN PATENT DOCUMENTS

JP    2003-84140    3/2003
JP    2003-344852    12/2003

OTHER PUBLICATIONS

Korean Intellectual Property Office, Office Action, mailed Jun. 20, 2006.

* cited by examiner

*Primary Examiner*—James A. Dudek
(74) *Attorney, Agent, or Firm*—Lowe Hauptman & Berner, LLP.

(57) ABSTRACT

An LCD backlight apparatus includes a light guide plate placed under an LCD panel of the LCD to guide light to the LCD panel. The light guide plate has an even upper surface and a scattering pattern formed in a bottom surface. A plurality of monochromatic light sources are placed in line at a side of the light guide plate to radiate light along the plane direction of the light guide plate between the upper and bottom surfaces of the light guide plate. The light sources are adapted to radiate light beams at a predetermined beam angle so that the light beams reach the scattering pattern only after having propagated a predetermined reference length necessary for forming white light when mixed together. The LCD backlight apparatus can reduce the Bezel width without increasing the thickness of the LCD.

16 Claims, 10 Drawing Sheets

LCD BACKLIGHT UNIT AND LCD HAVING THE SAME

RELATED APPLICATION

The present application is based on, and claims priority from, Korean Application Number 2004-73340, filed Sep. 14, 2004, the disclosure of which is hereby incorporated by reference herein in its entirety.

BACKGROUND OF THE INVENTION

1. Field of the Invention

The present invention relates to a Liquid Crystal Display (LCD) backlight apparatus, and more particularly, to an LCD backlight apparatus, which has a scattering pattern formed in the entire bottom surface of a light guide plate and a monochromatic light source for emitting light in a specific beam angle placed at a side of the light guide plate in order to reduce the Bezel width without increasing the thickness of an LCD, and an LCD having said LCD backlight.

2. Description of the Related Art

An LCD includes an LCD panel for verifying light transmittance in response to input electric signals to display various images, a circuit board for applying the electric signals to the LCD panel, a backlight apparatus for illuminating the LCD panel and a housing for enclosing these components.

The LCD panel generally has a pair of opposed substrates, crystal liquid interposed between the both substrates and pixel and common electrodes formed in opposed faces of the substrates, in which voltage is variably applied to the pixel and common electrodes to artificially re-arrange the orientation of liquid crystal molecules between the substrates and thus vary the transmittance of light thereby displaying various images.

An LCD backlight apparatus illuminates an LCD panel of an LCD via direct illumination or side-emitting illumination. In the direct illumination, light is projected onto the LCD panel directly from an underlying light source. In the side-emitting illumination, light from a light source is emitted in lateral directions and then re-directed upward via a reflective plate or a scattering pattern to illuminate the LCD panel.

An LCD backlight apparatus adopting the side-emitting illumination uses at least one set of RGB light sources to form white light. Generally, one RGB light source set includes four Light Emitting Diodes (LEDs) which are arranged in the order of B, G, R and G. In this case, it is required to precisely control light beams emitted from the respective LEDs to mix together before reaching the scattering pattern.

More detailed description will be provided with reference to FIGS. 1 and 2, in which FIG. 1 is a plan view illustrating the operation of a conventional LCD backlight apparatus, and FIG. 2 is a vertical cross-sectional view illustrating the operation of the conventional LCD backlight apparatus.

As shown in FIGS. 1 and 2, a conventional side-emitting backlight apparatus 10 is placed under an LCD panel (not shown) The backlight apparatus 10 includes a light guide plate 12 having a scattering pattern 14 in the underside and a plurality of LEDs 18 placed in support plates 16 at both sides of the light guide plate 12, in which the LEDs 18 are spaced from adjacent ones to a predetermined pitch P. An LED set includes B, G, R and G LEDs 18 (or RGB LEDs 18) to form white light, and functions as a light source of the LCD.

Each LED 18 emits light within an angle θ when seen in the plan view and an angle α when seen in the vertical cross-sectional view, which are referred to as "beam angles." The LED 18 has upward and downward beam angles typically in the range of ±15°.

Referring to FIG. 1, B, G, R and G light beams L are mixed together to form white light at a point P1 distanced from the light source, in which the distance from the light source, that is, the LEDs 18 to the point P1 will be referred to as a "reference length l." The reference length l is determined by the planar beam angle θ of the LEDs 18 and the interval of the LEDs 18, and expressed in Equation 1 below:

$$l = k \times P / \tan(\theta/2)$$  Equation 1, wherein k is coefficient of correlation.

In this case, it is required that the B, G, R and G light beams not collide against the scattering pattern 14 before propagating the reference length l. If the beams are reflected from the scattering pattern 20 before propagating the reference length l, partial RGB beams are mixed insufficient to form white light and therefore cause defective illumination such as a rainbow or hot spots when projected onto the LCD panel 20.

Therefore, the light guide plate 12 has patternless first areas 12A, which are extended inward to a predetermined patternless width l1 from both edges of the light guide plate 12, and a patterned second area 12B formed between the first areas 12A. The first areas 12A each have a smooth reflecting surface without any scattering pattern, but the second area 12B is provided with the scattering pattern 14 to reflect mixed white light toward the LCD panel 20. In this case, the patternless width l1 is determined by the reference length l of the LED 18 and the height h of the LED 18 from the bottom surface of the light guide plate 12 as expressed in Equation 2 below:

$$l1 = \sqrt{l^2 - h^2}$$  Equation 2.

That is, according to the arrangement of the scattering pattern 14 of the light guide plate 12 and the LEDs 18, the beeline of the LEDs 18 each to the scattering pattern 14 becomes the reference length l so that the light beams can reach the scattering pattern 14 only after being mixed into white light.

Describing the propagation and reflection of light by the above arrangement in more detail, first RGB beams L1 emitted at an upper beam angle α collides against the upper surface of the light guide plate 12 and is directed toward the bottom of the light guide plate 12 via internal reflection. The RGB beams L1 are mixed together to form white light while propagating to the bottom surface, and then projected toward the LCD panel 20 by the scattering pattern 14 in the bottom surface of the light guide plate 12.

Second RGB beams L2 emitted within the upper beam angle α are re-directed toward the LCD panel 20 via a process similar to that of the RGB beams L1.

Third RGB beams L3 emitted in an upper beam angle smaller than that of the second RGB beams L2 reach the first area 12A opposite to the light source thereof, and reflect plural times in the second area 12A before being projected by the scattering pattern 14 toward the LCD panel 20.

Fourth RGB beams L4 emitted within a downward beam angle a are mixed together forming white light when have directly reached the scattering pattern 14, and then projected by the scattering pattern 14 toward the LCD panel 20.

In the meantime, fifth RGB beams L5 emitted at a downward beam angle α are reflected sequentially by the bottom and upper surfaces of the light guide plate 12 before being projected by the scattering pattern 14 toward the LCD panel 20.

Accordingly, the conventional backlight apparatus 10 is required to ensure a "Bezel width" corresponding to the patternless width 11 in addition to the surface size of the LCD panel 20. Undesirably, the Bezel width increases the surface size of the LCD when LCD panel size or LCD screen size is fixed. The patternless width 11 is at least the Bezel width, and the patternless width and the Bezel width will be used equivalently in the specification unless specifically mentioned otherwise.

As an approach to reduce the Bezel width, the LEDs 18 as the RGB light source may be placed closer to reduce the pitch P. However, this approach disadvantageously raises the price of the backlight apparatus and an LCD as a final product.

An LCD backlight apparatus as shown in FIG. 3 has been proposed to overcome the foregoing disadvantages of the prior art.

Referring to a vertical cross-sectional view in FIG. 3, a conventional LCD backlight apparatus 30 includes an RGB light source 32 comprised of a plurality of LEDs, a first reflector 34 for laterally redirecting light beams L emitted from the RGB light source, a light guide 36 connected at one end to the first reflector 34 to guide the redirected light beams L to the other end thereof, a second reflector 38 attached by an input side to the other end of the light guide 36 to direct the light beams L in an opposite direction and a light guide plate 40 connected to an output side of the second reflector 38. The light guide plate 40 has a scattering pattern 42 in the bottom and a smooth transparent surface in the top. Since the top surface of the light guide plate 40 internally reflects light within the range of a predetermined angle, the light beams L introduced into the light guide plate 40 are reflected from the scattering pattern 42 directly or after being internally reflected by the upper surface of the light guide plate 40 so as to be projected toward an LCD panel (not shown) above the light guide plate 40.

This eliminates the necessity of ensuring the Bezel width to the extent of the patternless width 11 as in FIGS. 1 and 2, and thus the surface area of the LCD can be advantageously reduced.

However, the light guide 36 and the light source 32 are provided in the rear surface of the LCD, thereby disadvantageously increasing the thickness of the LCD.

Accordingly, a novel approach capable of decreasing the Bezel width without increasing the thickness of the LCD has been required.

SUMMARY OF THE INVENTION

The present invention has been made to solve the foregoing problems of the prior art and it is therefore an object of the present invention to provide an LCD backlight apparatus, which has a scattering pattern formed in the entire bottom surface of a light guide plate and at least one set of monochromatic light sources for emitting light at a specific beam angle placed at a side of the light guide plate, in order to reduce the Bezel width without increasing the thickness of an LCD.

It is another object of the invention to provide an LCD having said LCD backlight, which has a scattering pattern formed in the entire bottom surface of a light guide plate and at least one set of monochromatic light sources for emitting light at a specific beam angle placed at a side of the light guide plate, in order to reduce the Bezel width without increasing the thickness of an LCD.

According to an aspect of the invention for realizing the object, there is provided an LCD backlight apparatus comprising: a light guide plate placed under an LCD panel of the LCD to guide light to the LCD panel, the light guide plate having an even upper surface and a scattering pattern formed in a bottom surface; and a plurality of monochromatic light sources placed in line at a side of the light guide plate to radiate light along the plane direction of the light guide plate between the upper and bottom surfaces of the light guide plate, wherein the light sources are adapted to radiate light beams in a predetermined beam angle so that the light beams reach the scattering pattern only after having propagated a predetermined reference length necessary for forming white light when mixed together.

Preferably, the monochromatic light sources are placed at one side of the light guide plate, and the monochromatic light sources are placed at both sides of the light guide plate.

Preferably, each of the monochromatic light sources includes a Light Emitting Diode (LED) chip and an LED lens for adjusting light emitted from the LED chip in predetermined upward and downward beam angles when radiating the light into the light guide plate.

Preferably, the upward and downward beam angles may be the same with each other. Alternatively, the downward beam angle may be smaller than the upward beam angle.

Preferably, the scattering pattern is divided into a first area extended from an edge of the light guide plate to a point in which the light beams from the monochromatic light sources are mixed together and a second area extended from the first area, and wherein the scattering pattern is denser in the first area than in the second area.

Preferably, the light guide plate comprises a plurality of light guide plates.

Preferably, the reference length l and the upward and downward beam angles β are determined by Equations 1 and 2 below:

$$l = k \times P / \tan(\theta/2) \qquad \text{Equation 1, and}$$

$$\beta = \sin^{-1}(h/l) \qquad \text{Equation 2,}$$

wherein k is coefficient of correlation, θ is a planar beam angle of the light sources, P is a pitch of the light sources, and h is a height from the bottom surface of the light guide plate to the light sources.

According to an aspect of the invention for realizing the object, there is provided an LCD comprising: an LCD panel for displaying images in response input electric signals; a circuit board for applying the electric signals to the LCD panel; the backlight apparatus as previously described, which is placed under the LCD panel to backlight the LCD panel, and a housing for housing the LCD panel, the circuit board and the backlight unit.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 4:
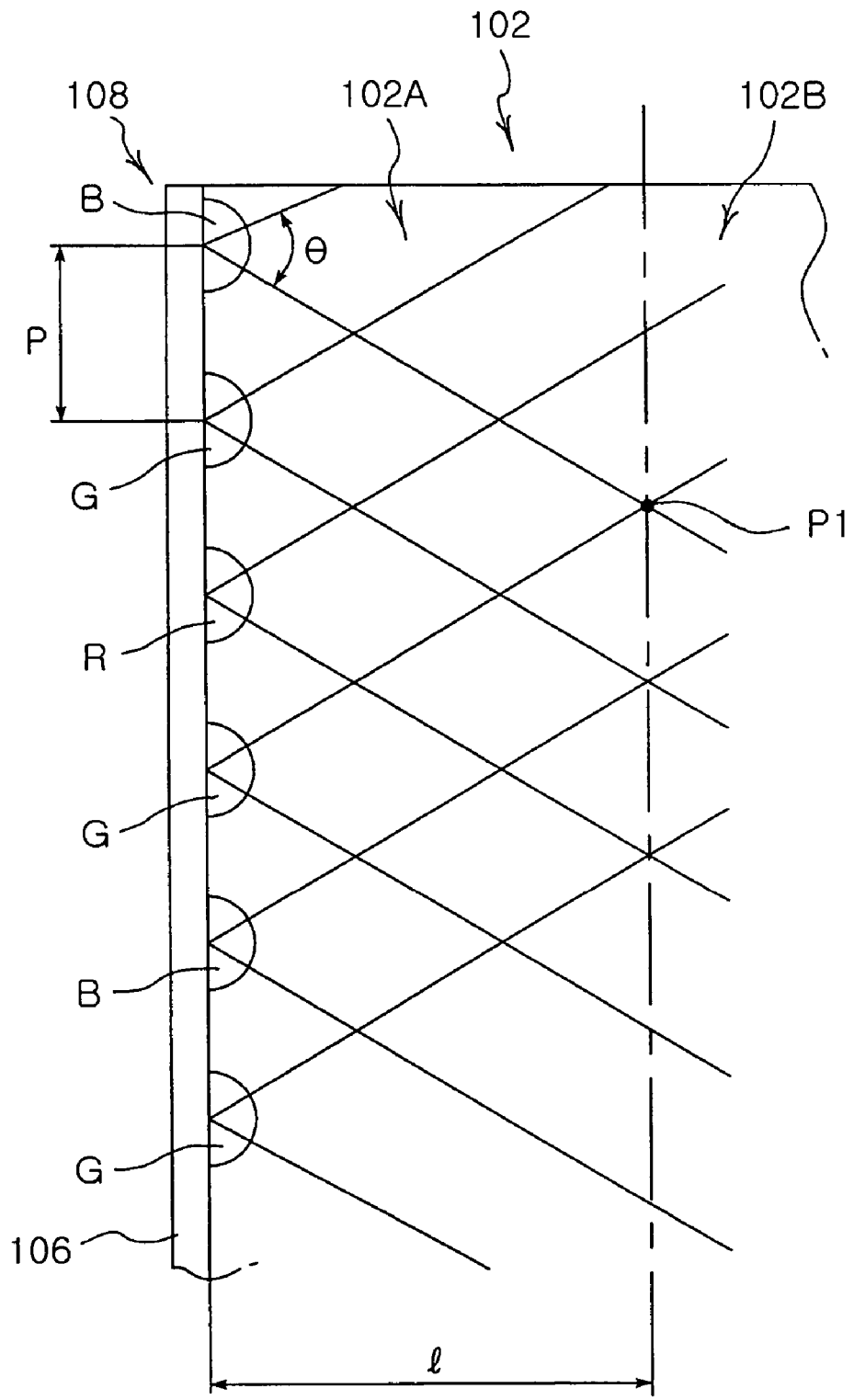
FIG. 4 is a plan view illustrating the operation of an LCD backlight apparatus of the invention.
Figure 5:
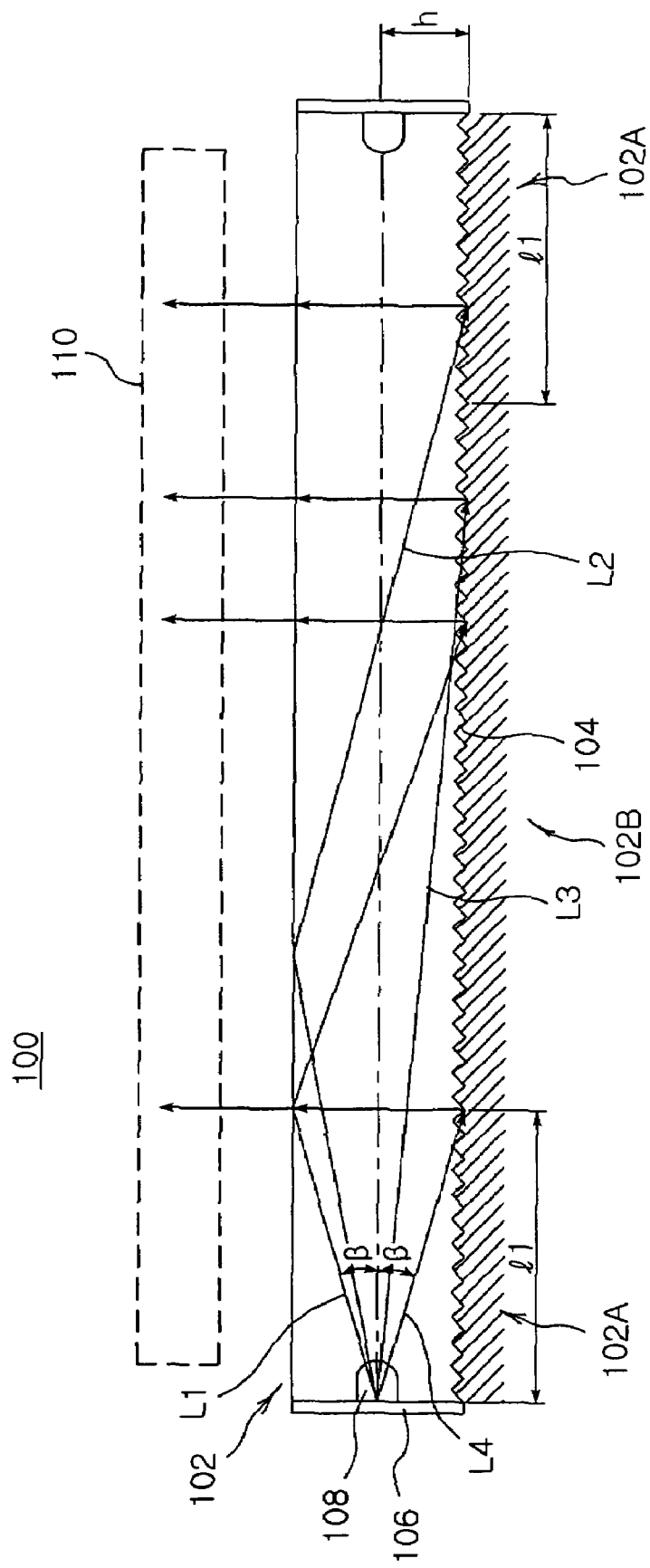
FIG. 5 is a vertical cross-sectional view illustrating the operation of an LCD backlight apparatus according to a first embodiment of the invention.

FIG. 4 is a plan view illustrating the operation of an LCD backlight apparatus of the invention, and FIG. 5 is a vertical cross-sectional view illustrating the operation of an LCD backlight apparatus according to a first embodiment of the invention.

Referring to FIGS. 4 and 5, a side-emitting backlight apparatus 100 of the invention is placed under an LCD panel 110 of an LCD (not shown). The backlight apparatus 100 includes a light guide plate 102 having a scattering pattern 104 formed in the entire bottom thereof and a plurality of LEDs 108 placed in support plates 106 at both sides of the light guide plate 102. Each of the LEDs 108 is designed to emit monochromatic light, and spaced from adjacent ones to a predetermined pitch P.

An LED set includes B, G, R and G LEDs 108 (or RBG LEDs 108) to form white light, and functions as a light source of the LCD. Each of the LEDs 108 emits light in a beam angle θ when seen in the plan view and upward and downward beam angles β when seen in the cross-sectional view. While it is illustrated that the LEDs 108 are placed at both sides of the light guide plate 102, the LEDs 108 may be placed at one side of the light guide plate 102 so as to realize the object of the invention.

In FIG. 4, the reference length l is the distance from a BGRB LED 108 set to a point where light beams emitted from the BGRB LED 108 set are mixed together to form white light, and determined by the pitch P and the plane beam angle θ of the LEDs 108.

According to characteristics of the invention having this structure, the scattering pattern 104 is formed in the entire bottom surface of the light guide plate 102, and the LEDs 108 each have a lens for guiding light in a specific beam angle.

The upward and downward beam angles β are determined according to the reference length l of the LED 108 adopted in the backlight apparatus 100 of the invention. Unlike the prior art, the upward and downward beam angles β of an LED 108 of the invention are so determined that, when light beams L1 to L4 emitted from the LED 108 directly collide against the scattering pattern 104, the shortest one of the light beams L1 to L4 has propagated at least the reference length l. Therefore, RGB light beams emitted from the LEDs 108 or the RGB light source within the upward and downward beam angles β propagate at least the reference length l and mix together to form white light before colliding against the scattering pattern 104.

In this case, the upward and downward beam angles β are determined by the height h of an LED 108 from the bottom of the light guide plate 102 and the reference length l, which is defined by Equation 1 below:

$$l = k \times P / \tan(\theta/2)$$ Equation 1.

Then, the upward and downward beam angles β are expressed as Equation 2 below:

$$\beta = \sin^{-1}(h/l)$$ Equation 2.

At the same height, the upward and downward beam angles β of the LED 108 adopted in the backlight apparatus 100 of the invention are smaller than those of the conventional LED.

LEDs and/or LED lenses having the above structure are described in Korean Patent Applications and their US correspondents filed by the assignee of this application, which include Korean Patent Application No. 2004-37764 filed May 27, 2004 (U.S. patent application Ser. No. 10/917,383), 2004-63213 filed Aug. 11, 2004 (U.S. patent application Ser. No. 10/953,816) and 2004-63630 filed Aug. 12, 2004 (U.S. patent application Ser. No. 10/957,650). Disclosures of these documents are hereby incorporated by reference herein in their entirety.

Figure 1:
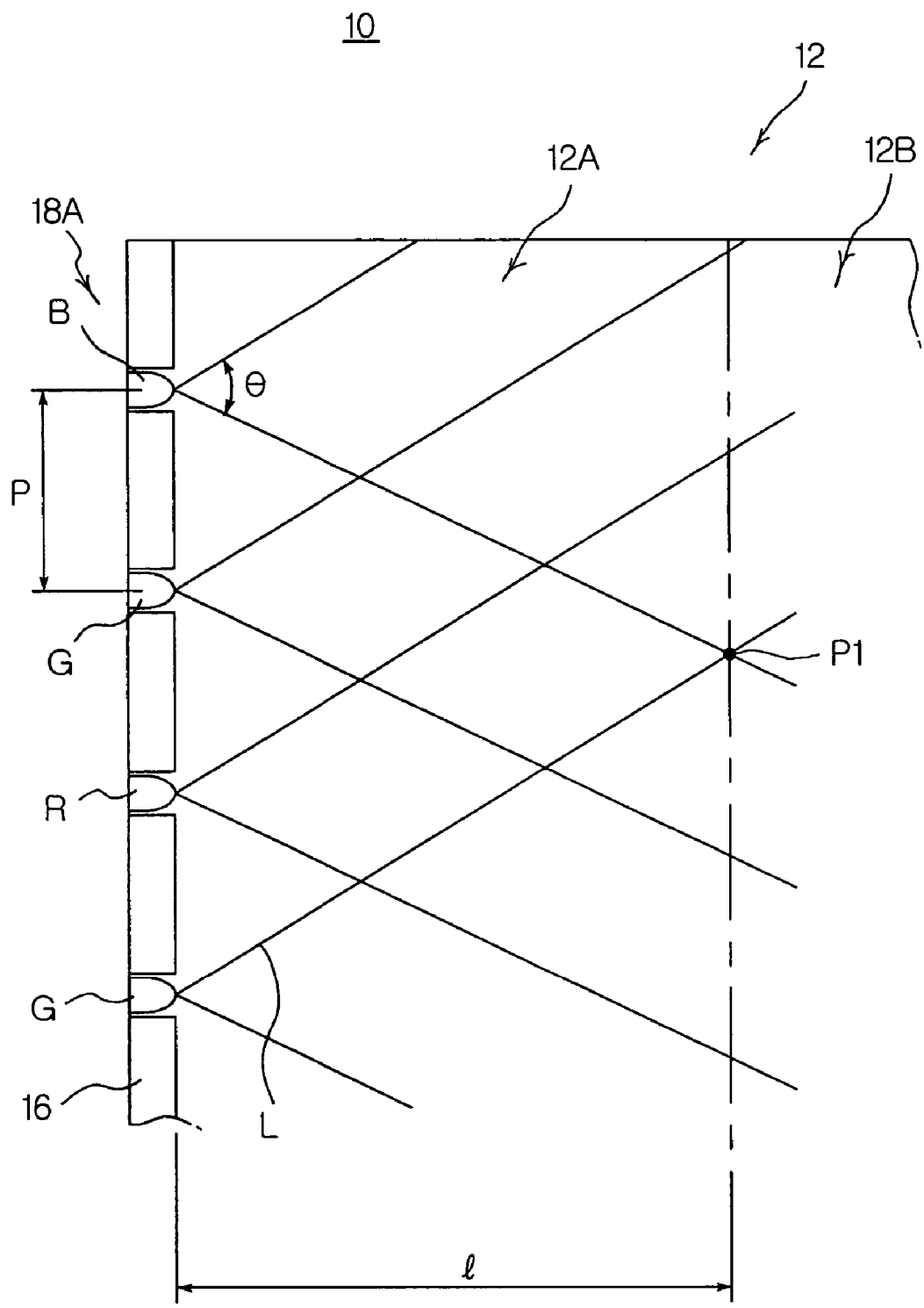
FIG. 1 is a plan view illustrating the operation of a conventional LCD backlight apparatus.
Figure 2:
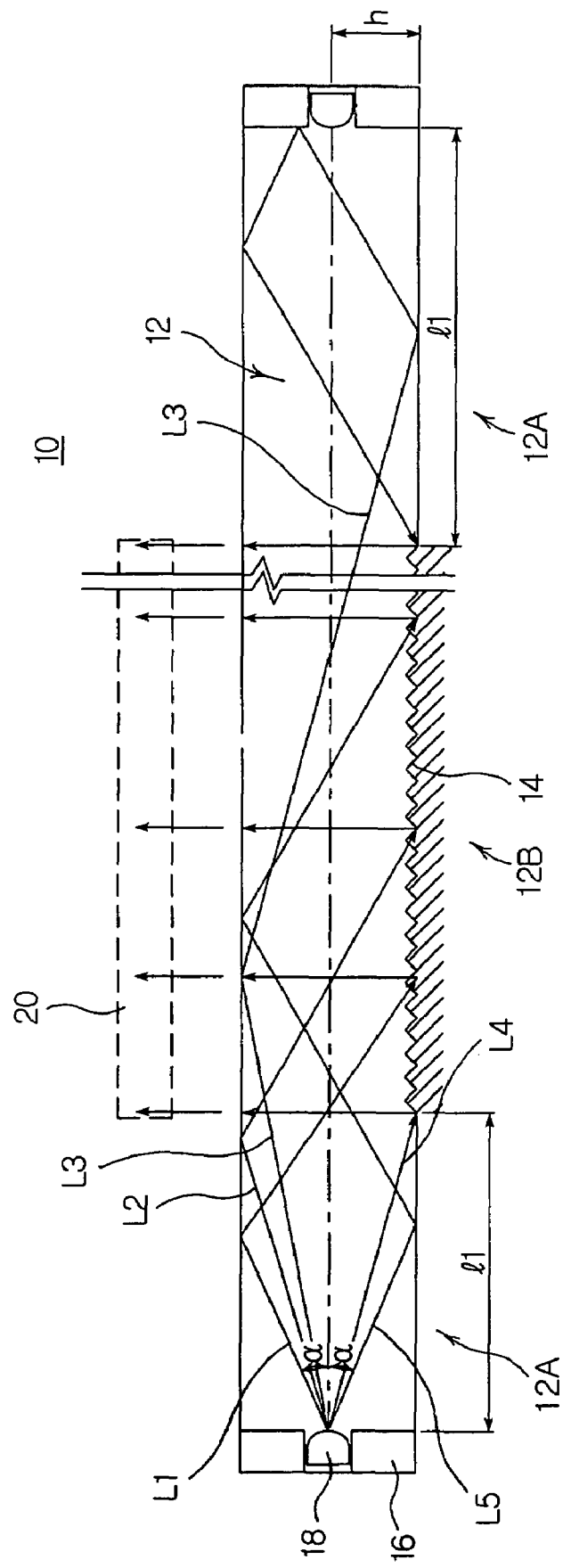
FIG. 2 is a vertical cross-sectional view illustrating the operation of the conventional LCD backlight apparatus.

In FIG. 5, first areas 102A are formed between ends of the scattering pattern 104 and points on the scattering pattern 104 onto which light beams L4 at a downward beam angle D directly collide (only one light beam is shown), and a second area 102B is formed between the first areas 102A. The width of the first areas 102A corresponds to a Bezel width l1 that is the patternless width of the conventional backlight apparatus in FIG. 2. Accordingly, in the backlight apparatus 100 of the invention, it can be seen that the scattering pattern 104 is further formed to the extent of the Bezel width l1 compared to the conventional backlight apparatus 10 in FIG. 2. The Bezel width l1 can be obtained from any of Equations 3 and 4 below:

$$l1 = \sqrt{l^2 - h^2}$$ Equation 3, and $$l1 = l \times \cos\beta$$ Equation 4.

As described above, since the LED 108 is so designed that only white light reaches the scattering pattern 104, the scattering pattern 104 formed in the entire bottom surface of the light guide plate 102 does not cause any illumination defects such as a rainbow or hot spots observed in the prior art.

Figure 3:
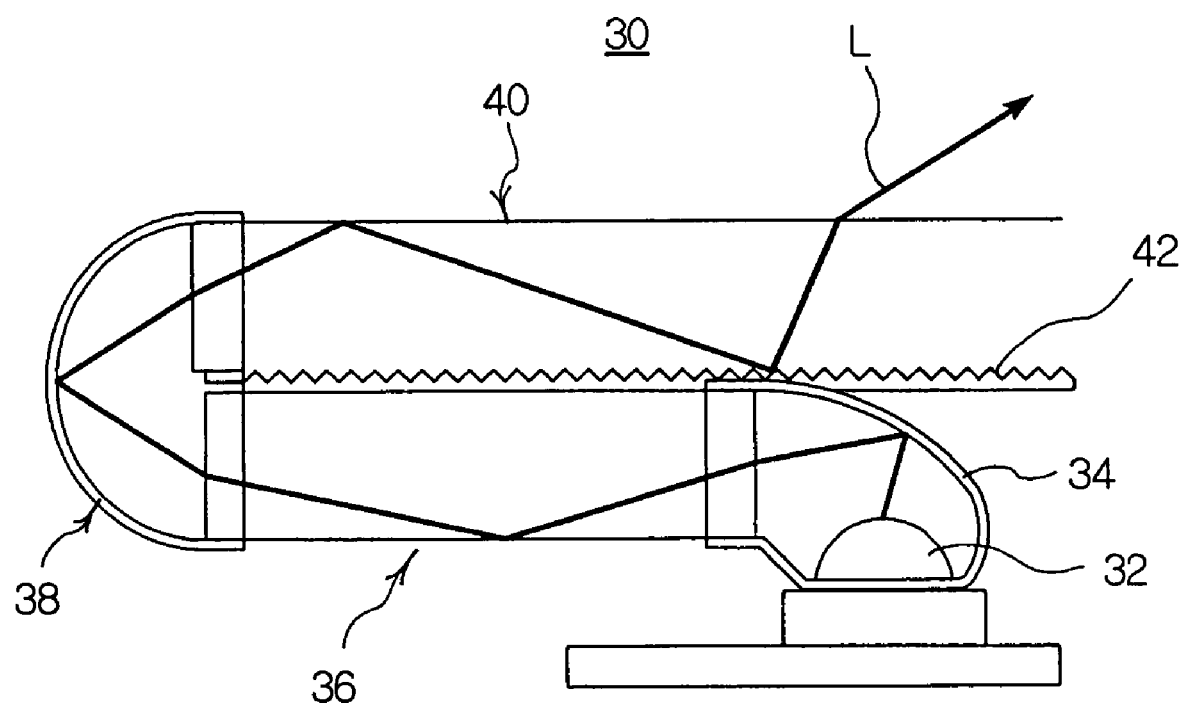
FIG. 3 is a vertical cross-sectional view illustrating another conventional LCD backlight apparatus.

As a result, unlike the conventional LCD panel in which patternless areas corresponding to the Bezel width l1 are required in addition to the surface area thereof, the invention can ensure the first areas 102A corresponding to the Bezel width l1 also as a portion of a light guide area for the illumination of the LCD panel, thereby remarkably reducing the surface area of the LCD at a fixed LCD panel size. In addition, the invention does not increase the weight of the backlight apparatus unlike that in FIG. 3 in which the light guide is overlapped with the light guide plate.

While only left one of the LEDs 106 has been described as an example, the afore-description will be equivalently applied to right one of the LEDs 106 in the drawings.

In addition, the scattering pattern 104 in the first areas 102A can be formed closer than that in the second area 102B in order to further increase the internal uniformity of the entire light guide plate 102.

Figure 6:
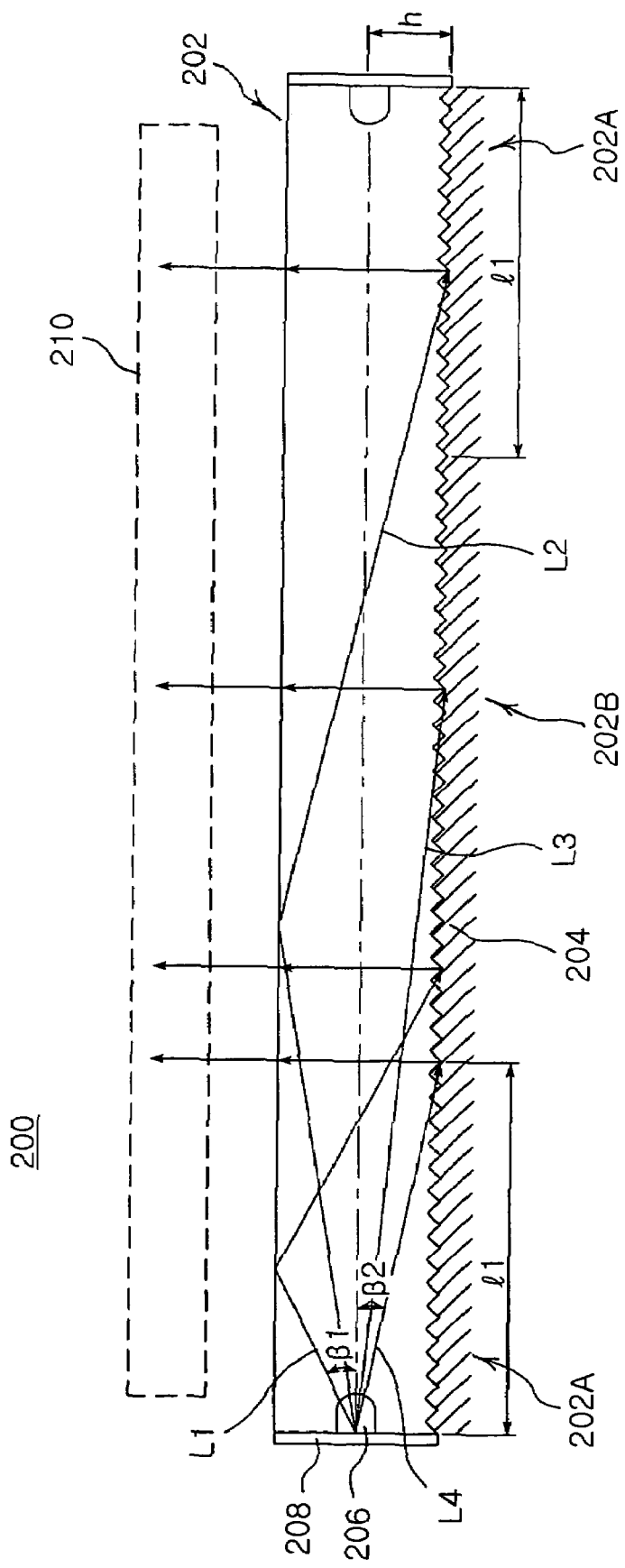
FIG. 6 is a vertical cross-sectional view illustrating the operation of an LCD backlight apparatus according to a second embodiment of the invention.

FIG. 6 is a vertical cross-sectional view illustrating the operation of an LCD backlight apparatus according to a second embodiment of the invention.

Referring to FIG. 6, an LCD backlight apparatus 200 according to a second embodiment of the invention has substantially the same structure as the LCD backlight apparatus 100 according to the first embodiment of the invention except that LEDs 206 emit light at different upward and downward beam angles β1 and β2.

In this embodiment, a light beam L4 emitted from an LED 206 at a downward beam angle β2 reaches the scattering pattern 204 after propagating a predetermined path, which is referred to as a reference length l. Other light beams L1, L2 and L3 emitted from the LED 206 collide against the scattering pattern 204 after propagating at least the reference length l as the light beam L4 having the downward beam angle Accordingly, the scattering pattern 204 can be formed not only in a second area 202B but also in first areas 202A corresponding to the Bezel width l1 of the prior art without resulting in any display defects.

In the backlight apparatus 200 of this embodiment, some of upwardly directed light beams (only one of which is shown and indicated with L1) can be internally reflected from the top surface of the light guide plate 202 before propagating the reference length l, thereby further improving the light uniformity within the entire light guide plate 202.

In addition, the density of the scattering pattern 204 in the first areas 202A can be increased than that in the second area 202B, thereby further improving the light uniformity within the entire light guide plate 202.

Hereinafter an exemplary LED lens adopted in the backlight apparatus of the invention will be illustrated with reference to FIGS. 7 to 10. The LED lens is described in Korean Patent Application No. 2004-63630 and its US correspondent (U.S. patent application Ser. No. 10/957,650), the disclosure of which is hereby incorporated by reference herein in their entirety.

Figure 7:
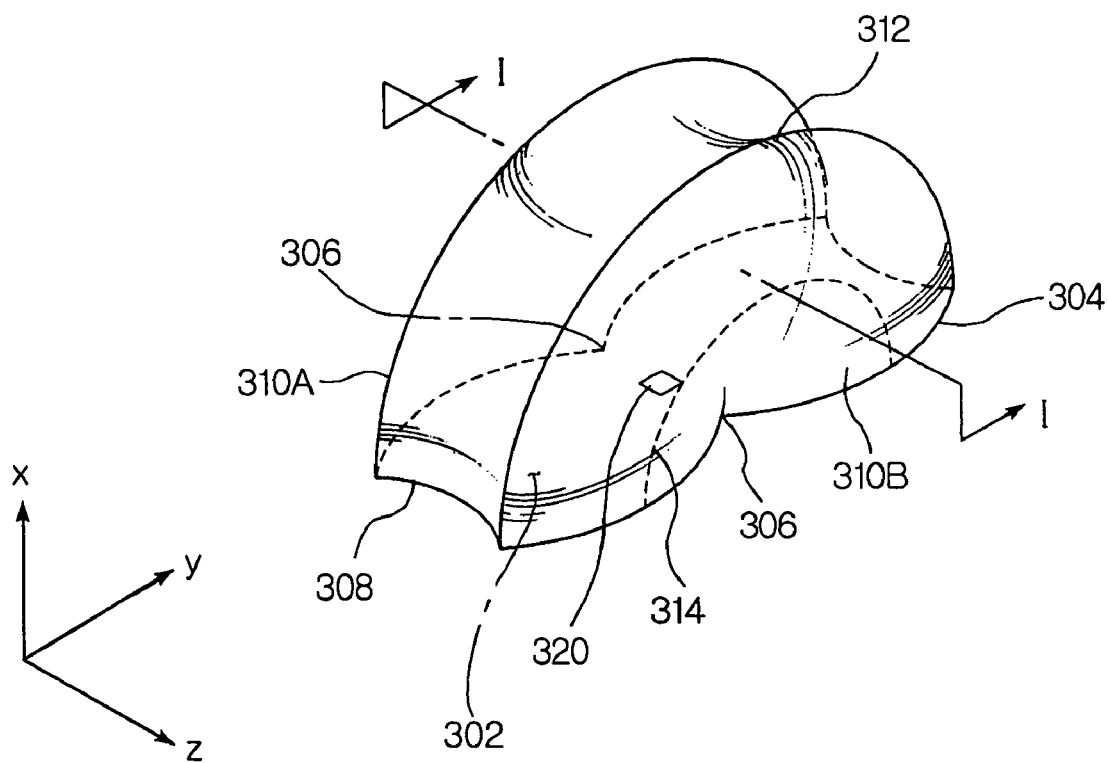
FIG. 7 is a perspective view illustrating an exemplary LED lens adopted in an LCD backlight apparatus of the invention.

Referring to the perspective view of the LED lens shown in FIG. 7, an LED lens 300 adopted in the invention is made of transparent material, and so configured to radiate light, which is emitted from an underlying LED chip 320, to the outside in a specific beam angle. The axis system of FIG. 7 is made identical with that of FIG. 11 for the sake of convenience.

The LED lens 300 has a peanut-shaped planar bottom 302, a pair of reflecting surfaces 310A and 310B extended upward from the bottom 302 and a radiating surface 316 formed between the bottom 302 and the reflecting surfaces 310A and 310B. The LED lens 300 has an overall configuration as is drawn by rotating a cross section S shown in FIG. 8 for 180° around a base line A thereof.

Figure 8:
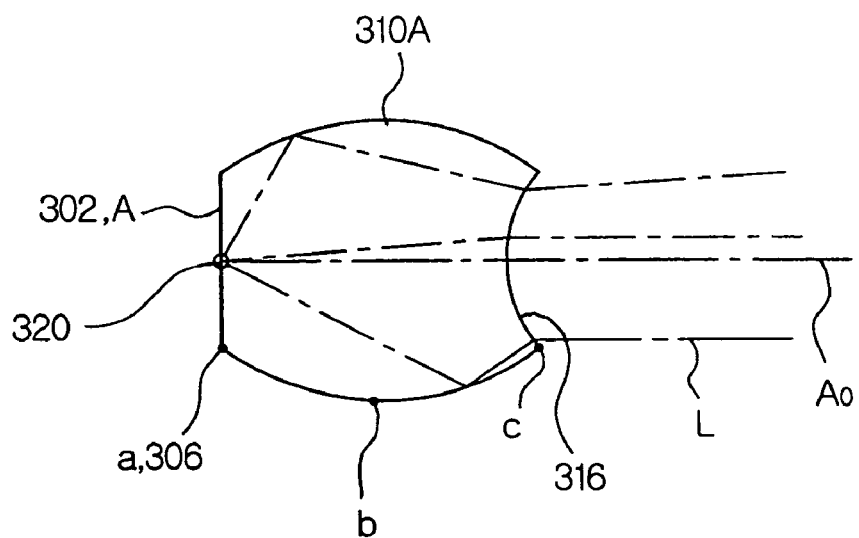
FIG. 8 is a cross-sectional view illustrating beam angle characteristics of the LED lens shown in FIG. 7.

The cross section S shown in FIG. 8 is constituted of the straight base line A, a pair of convex arc-shaped side lines B, which are opposed to each other and extended upward from both ends of the base line A, and a concave arc-shaped top line C drawn between top ends of the side lines B.

The cross section S of FIG. 8 is taken along the line I-I of FIG. 7 so that the LED lens 300 of FIG. 7 is cut along a straight line drawn between a pair of connecting points 306. The LED lens 300 has a cross-sectional configuration the same as that in FIG. 8 when taken along the straight line between the connecting points 306, that is, the base line A in FIG. 8, regardless of a radial position which the cross section S passes.

Hereinafter the structure of the LED lens 300 will be described in conjunction with the cross-sectional configuration in FIG. 8.

As described above, the LED lens 300 is designed to radiate light from the LED chip 320 in a predetermined beam angle to the outside, as will be described hereinafter with reference to FIGS. 8 to 10.

First, FIG. 8 illustrates beam angle characteristics in the cross section S of the LED lens 300. When emitted from the LED chip 320, which is expressed as a point light source for the convenience's sake, light beams L are radiated in part directly through the radiating surface 316 to the outside. Parts of the light beams L are reflected from the reflecting surfaces 310A and 310B, and then radiated to the outside through the radiating surface 316. Herein a light path $A_o$ directed perpendicularly forward from the LED chip 320 will be referred to as "optical axis" for the convenience's sake. Since the cross-sectional configuration as in FIG. 8 exists for 180° about a line between the connecting points 306 or the base line A in the entire LED lens 300, the optical axis $A_o$ also exists for about 180° and therefore draws a semicircle.

In this case, first reflecting surface regions of the reflecting surfaces 310 from the first connecting points a to the second connecting points b are so designed to reflect beams L from the LED chip 320 through total internal reflection. The configuration of the reflecting surfaces 310 between the first and second connecting points a and b is determined based upon the refractivity of the lens 300 and that of the external environment (i.e., the air in general).

The radiating surface 316 outwardly radiates the beams L that are incident to the radiating surface 316 directly from the LED chip 320 and through reflection from the reflecting surfaces 310. In this case, since the radiating surface 316 is concave, the beams L tend to spread out rather than to converge toward the optical axis $A_o$ when they are radiated to the outside. The beams L are radiated to the outside in the range of a predetermined beam angle with respect to the optical axis, the beam angle is determined by the configuration of the lens 300, and more particularly, the configuration of the reflecting and radiating surfaces 310 and 316 and the refractivity of the lens 300.

Figure 9:
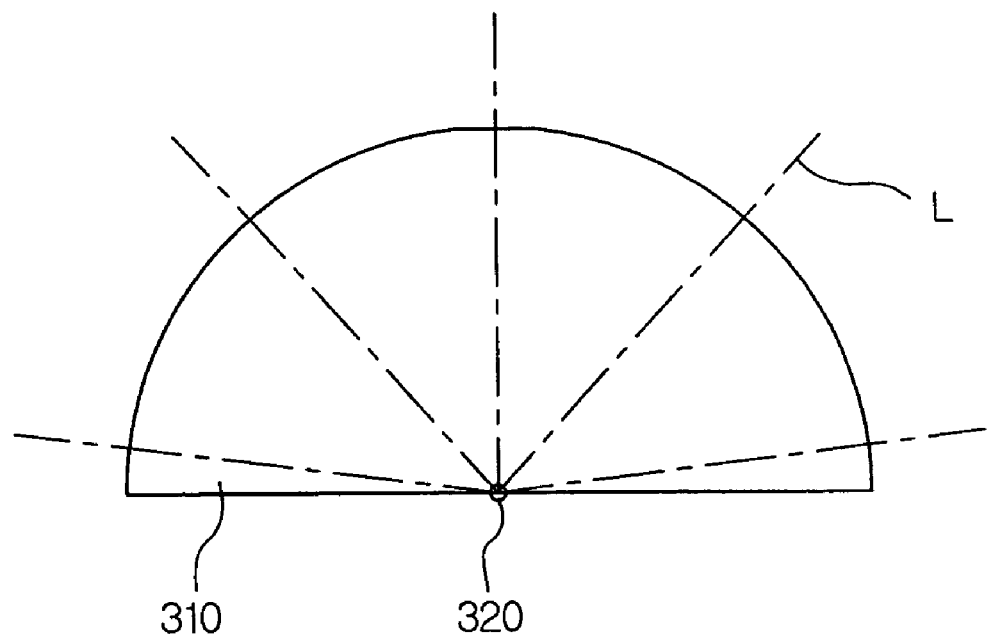
FIG. 9 is a plan view illustrating beam angle characteristics of the LED lens in FIG. 7.

FIG. 9 shows beam angle characteristics of the LED 300 in a plane direction. When seen in an x-y plane, light beams emitted from the LED chip 320 radially propagate from the light source. Since the radiating surface 316 is configured the same as the locus drawn by the top line C when the cross section S of FIG. 8 is rotated for 180° about the base line A as described hereinbefore, respective points of the radiating surface 316 on the same plane are spaced equivalently from the point light source of the LED chip 320. In this case, the LED chip 320 is placed at the center of a circle, and the radiating surface 316 draws a semicircle.

Figure 10:
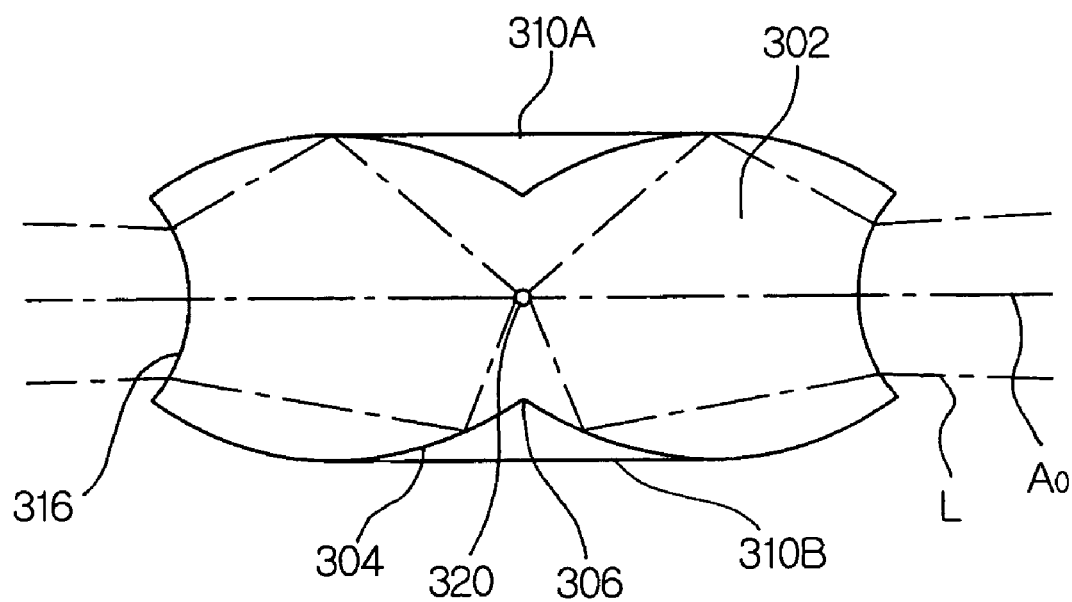
FIG. 10 is a bottom view illustrating beam angle characteristics of the LED lens in FIG. 7.

FIG. 10 shows beam angle characteristics at the bottom 302 of the LED 300. The reflection and radiation at the bottom 302 of the LED lens 300 is substantially the same as that in FIG. 8. In addition, since the bottom 302 has a configuration obtained by coupling two of the cross section S together about the base line A, the light beams L are radiated symmetrically to the right and left in the drawing from the LED chip 320 that is a point light source.

Accordingly, when the LED lens 300 of this embodiment radiates the light beams L emitted from LED chip 320 to the outside, x- and y-axial components of the light beams propagate in radial directions as they are but z-axial components thereof are redirected in x- and/or y-axial directions. As a result, when radiated to the outside through the radiating surface 316 of the LED lens 300, the light beams L are refracted within the predetermined beam angle about the optical axis $A_o$ while spreading in the radial directions.

The range of beam angle is determined by the configuration and refractivity of the LED lens 300. For example, shaping the reflecting surfaces 310 asymmetric may create asymmetric beam angles. This LED lens 300 can be adopted in the backlight apparatus 200 according to the second embodiment of the invention.

Figure 11:
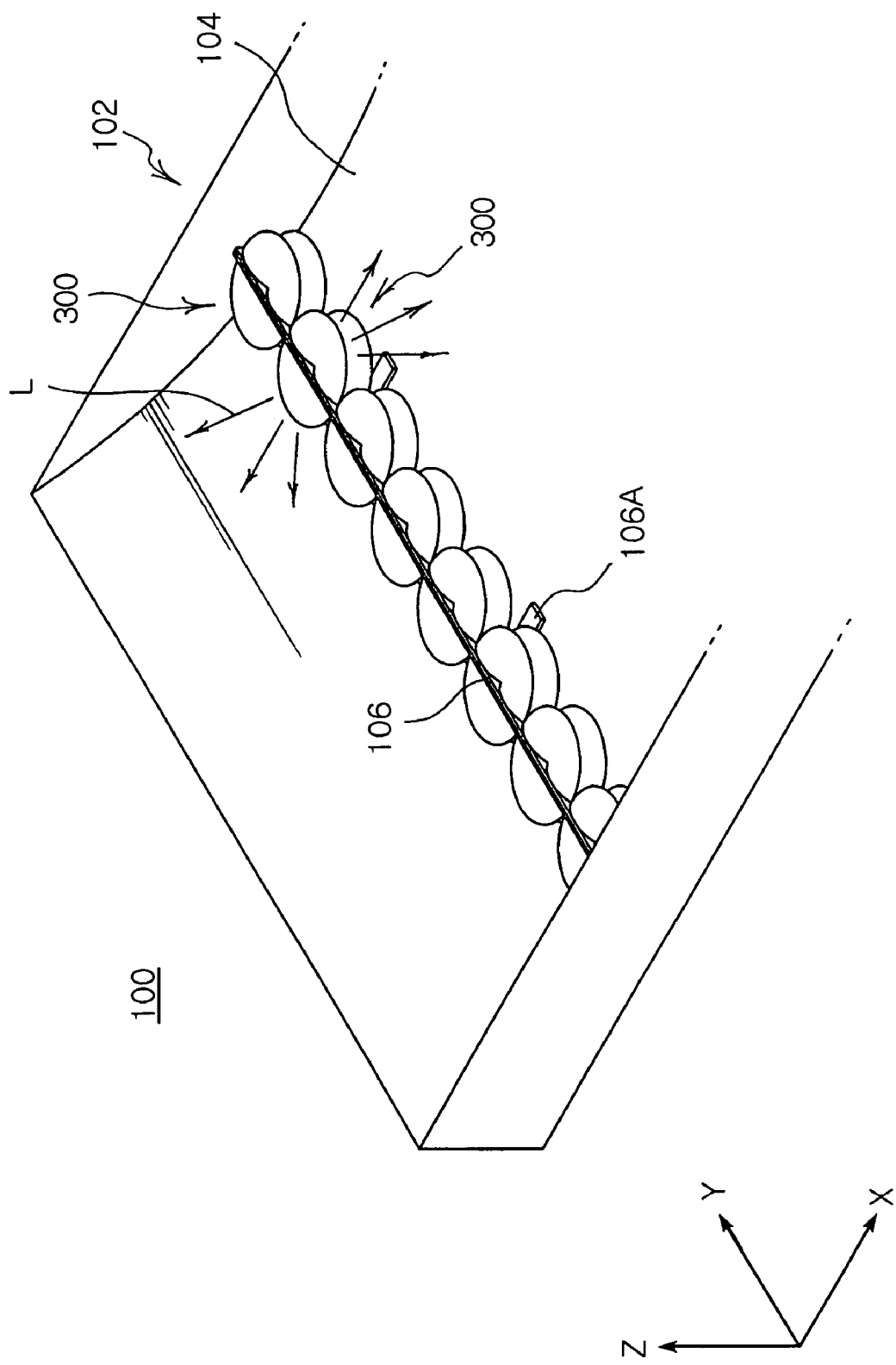
FIG. 11 is a perspective view of an exemplary backlight apparatus of the invention adopting the LED lens as shown in FIG. 7.

FIG. 11 is a perspective view of an exemplary backlight apparatus of the invention adopting the LED lens as shown in FIG. 7.

In the backlight apparatus 100 of the invention as shown in FIG. 11, the LED lenses 300 as shown in FIG. 7 are installed in a housing 102 via a support plate 106, which is fixed to the bottom plate 104 of the housing 102.

In such a structure, light beams L are emitted from the LED lens 300 within a beam angle into a light guide plate (not shown) of the housing 102. That is, the light beams L spread in x- and y-axial directions but not beyond the beam angle in the z-axis. The light beams L propagating in the plane direction of the light guide plate of the housing 102 are mixed together before being reflected from the scattering pattern 104 toward an LCD panel (as shown in FIG. 5) to backlight an LCD.

This structure can be equivalently applied to the backlight apparatus according to the second embodiment of the invention when the LED lenses 300 are modified to have an asymmetric geometry.

Figure 12:
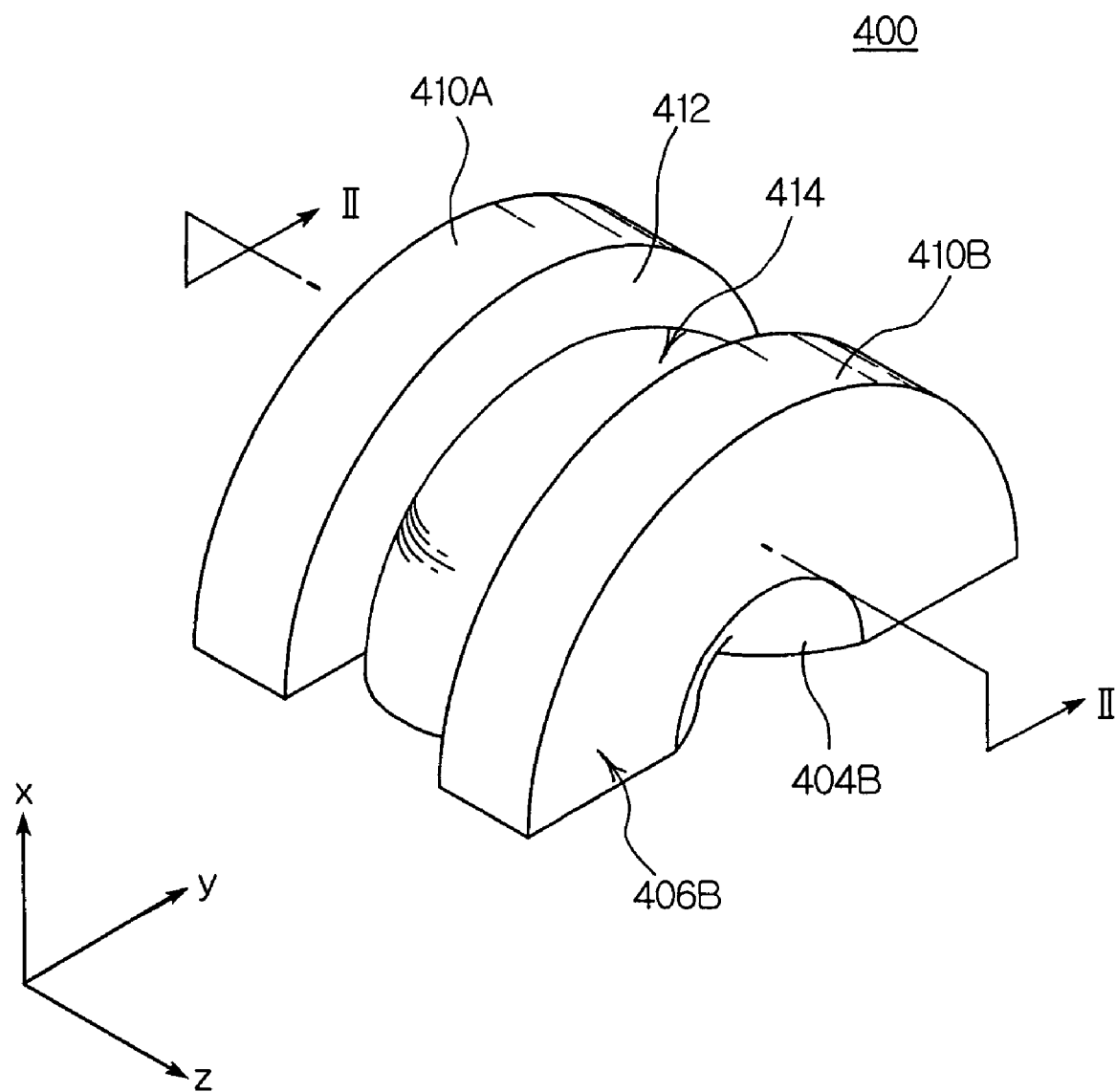
FIG. 12 is a perspective view of another exemplary LED lens adopted in the LCD backlight apparatus of the invention.

FIG. 12 is a perspective view of another exemplary LED lens adopted in the LCD backlight apparatus of the invention. This LED lens is also disclosed in Korean Patent Application 2004-63630 and its US correspondent (U.S. patent application Ser. No. 10/957,650), the disclosure of which is hereby incorporated by reference herein in their entirety.

The LED lens 400 is made of transparent material, and so configured to radiate light from an LED chip, which is placed in the bottom thereof, to the outside in a specific beam angle.

The LED lens 400 of this embodiment includes a planar bottom, a pair of first and second reflecting surfaces 404B and 406B (only right ones of the first and second reflecting surfaces are shown) extended upward from the bottom, first and second radiating surfaces 410A, 410B and 414 formed between the bottom and the second reflecting surfaces 406B and intermediate surfaces 412.

When light beams are emitted from the LED chip, the first and second reflecting surfaces 404B and 406B of the LED lens 400 reflect z-axial components of the beams into x- and y-axial directions so that the reflected light beams are radiated through the radiating surfaces 410A, 410B and 414.

The LED lens 400 also radiates the light beams from the LED chip to the outside up to the range of 180° in the x- and y-axial directions as the foregoing LED lens 300 but within a beam angle range in the z-axial direction. The beam angle range is determined by the configuration and material of the LED lens 400.

The LED 400 can be adopted in the backlight apparatus 100 according to the first embodiment of the invention.

In the meantime, the first radiating surfaces 410A and 410B may be provided with different configurations or inclinations or the reflecting surfaces 404B and 406B may be asymmetric with the opposed reflecting surfaces (not shown) in order to adjust beam angles of light emitted from the lens 400 different from each other along the z axis. An LED lens of this structure can be adopted in the backlight apparatus 200 according to the second embodiment of the invention.

The LED lens 300 and 400 as shown in FIGS. 7 to 12 are examples applicable to the backlight apparatus of the invention, but is not to be construed as the limit of the LED lens adopted in the backlight apparatus of the invention.

The backlight apparatuses 100 and 200 of the invention can be applied to various types of LCDs each including an LCD panel, a circuit board for applying electric signals to the LCD panel and a housing for housing the LCD panel and the circuit board.

In addition, the backlight apparatus may have a single light guide plate or a plurality of light guide plates according to the surface area of the LCD panel.

As described above, the LCD backlight apparatus of the invention has the scattering pattern formed in the entire bottom of the light guide plate and the monochromatic light source for emitting light in predetermined beam angles placed at the side of the light guide plate in order to reduce the Bezel width without increasing the thickness of an LCD. Accordingly, the size of the LCD can be reduced remarkably at a fixed surface area of an LCD panel.

While the present invention has been shown and described in connection with the preferred embodiments, it will be apparent to those skilled in the art that modifications and variations can be made without departing from the spirit and scope of the invention as defined by the appended claims.

What is claimed is:

1. A Liquid Crystal Display (LCD) backlight apparatus for an LCD, said backlight apparatus comprising:

a light guide plate adapted to be placed under an LCD panel of the LCD to guide light to the LCD panel, the light guide plate having an even upper surface and a scattering pattern formed on a bottom surface thereof; and a plurality of monochromatic light sources placed in line at a side of the light guide plate to radiate light along the plane direction of the light guide plate between the upper and bottom surfaces of the light guide plate; wherein the light sources are adapted to radiate light beams at a predetermined beam angle so that the light beams reach the scattering pattern only after having propagated a predetermined reference length necessary for forming white light when the light beams are mixed together; and each of the monochromatic light sources includes a Light Emitting Diode (LED) chip and an LED lens for directing light emitted from the LED chip at predetermined upward and downward beam angles into the light guide plate.

2. The LCD backlight apparatus according to claim 1, wherein the monochromatic light sources are placed at one side of the light guide plate.

3. The LCD backlight apparatus according to claim 1, wherein the monochromatic light sources are placed at both sides of the light guide plate.

4. The LCD backlight apparatus according to claim 1, wherein the upward and downward beam angles are the same.

5. The LCD backlight apparatus according to claim 1, wherein the downward beam angle is smaller than the upward beam angle.

6. The LCD backlight apparatus according to claim 1, wherein the scattering pattern is divided into a first area extended from an edge of the light guide plate to a point in which the light beams from the monochromatic light sources are mixed together and a second area extended from the first area, and wherein the scattering pattern is denser in the first area than in the second area.

7. The LCD backlight apparatus according to claim 1, wherein the light guide plate comprises a plurality of light guide plates.

8. The LCD backlight apparatus according to claim 1, wherein the reference length l and the upward and downward beam angles β are determined by Equations 1 and 2 below:

$$l = k \times P / \tan(\theta/2) \qquad \text{Equation 1, and}$$

$$\beta = \sin^{-1}(h/l) \qquad \text{Equation 2,}$$

wherein k is coefficient of correlation, θ is a planar beam angle of the light sources, P is a pitch of the light sources, and h is a height from the bottom surface of the light guide plate to the light sources.

9. A Liquid Crystal Display (LCD), comprising:
an LCD panel for displaying images in response to input electric signals;
a circuit board for applying the input electric signals to the LCD panel;
a backlight apparatus placed under the LCD panel to provide backlight to the LCD panel, wherein the backlight apparatus includes:
  a light guide plate placed under the LCD panel of the LCD to guide light to the LCD panel, the light guide plate having an even upper surface and a scattering pattern formed on a bottom surface thereof; and
  a plurality of monochromatic light sources placed in line at a side of the light guide plate to radiate light along the plane direction of the light guide plate between the upper and bottom surfaces of the light guide plate; and
a housing for housing the LCD panel, the circuit board and the backlight apparatus; wherein
the light sources are adapted to radiate light beams at a predetermined beam angle so that the light beams reach the scattering pattern only after having propagated a predetermined reference length necessary for forming white light when the light beams are mixed together; and
each of the monochromatic light sources includes a Light Emitting Diode (LED) chip and an LED lens for directing light emitted from the LED chip at predetermined upward and downward beam angles into the light guide plate.

10. The LCD according to claim 9, wherein the monochromatic light sources are placed at both sides of the light guide plate.

11. The LCD according to claim 9, wherein the monochromatic light sources are placed at one side of the light guide plate.

12. The LCD according to claim 9, wherein the upward and downward beam angles are the same.

13. The LCD according to claim 9, wherein the downward beam angle is smaller than the upward beam angle.

14. The LCD according to claim 9, wherein the scattering pattern is divided into a first area extended from an edge of the light guide plate to a point in which the light beams from the monochromatic light sources a mixed together and a second area extended from the first area, and wherein the scattering pattern is denser in the first are than in the second area.

15. The LCD according to claim 9, wherein the light guide plate comprises a plurality of light guide plates.

16. The LCD according to claim 9, wherein the reference length l and the upward and downward beam angles β are determined by Equations 1 and 2 below:

$$l = k \times P / \tan(\theta/2) \qquad \text{Equation 1, and}$$

$$\beta = \sin^{-1}(h/l) \qquad \text{Equation 2,}$$

wherein k is coefficient of correlation, θ is a planar beam angle of the light sources, P is a pitch of the light sources, and h is a height from the bottom surface of the light guide plate to the light sources.

\* \* \* \* \*